(12) United States Patent
Little

(10) Patent No.: US 8,303,321 B1
(45) Date of Patent: Nov. 6, 2012

(54) CARD CONNECTOR ANTI-MISINSERTING A MICRO SD CARD

(75) Inventor: Terrance F. Little, York, PA (US)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 13/174,866

(22) Filed: Jul. 1, 2011

(51) Int. Cl.
*H01R 13/62* (2006.01)

(52) U.S. Cl. ........................................................ 439/159

(58) Field of Classification Search .................. 439/630, 439/159, 633
See application file for complete search history.

(56) References Cited

U.S. PATENT DOCUMENTS

| | | | |
|---|---|---|---|
| 7,165,997 B1 * | 1/2007 | Hou | 439/630 |
| 7,314,390 B1 * | 1/2008 | Lai et al. | 439/630 |
| 7,632,117 B1 * | 12/2009 | Van der Steen | 439/159 |
| 7,780,476 B2 * | 8/2010 | Sun et al. | 439/630 |
| 7,819,678 B2 * | 10/2010 | Ye et al. | 439/159 |
| 7,901,225 B2 * | 3/2011 | Maruyama | 439/159 |
| 7,927,117 B2 * | 4/2011 | Yu et al. | 439/159 |
| 8,142,229 B1 * | 3/2012 | Bobuk et al. | 439/630 |
| 2010/0087074 A1 | 4/2010 | Yu et al. | |

* cited by examiner

*Primary Examiner* — Phuong Dinh
(74) *Attorney, Agent, or Firm* — Ming Chieh Chang; Wei Te Chung

(57) ABSTRACT

A card connector (100) used for receiving an inserted card (5), defining a card receiving space and a card insertion/ejection direction, includes an insulative housing (2) having a holding portion (2323), a number of contacts (3) retained in the insulative housing, a slider (41) having a lock retention pocket (413) releasably engaged with the holding portion of the insulative housing, and a spring (42) compressed between the insulative housing and the slider for urging the slider along a card ejection direction. The slider is moveable relative to the insulative housing in response to a separation of the holding portion from the lock retention pocket.

13 Claims, 10 Drawing Sheets

US 8,303,321 B1

CARD CONNECTOR ANTI-MISINSERTING A MICRO SD CARD

CROSS-REFERENCE TO RELATED APPLICATIONS

This patent application relates to a U.S. patent application Ser. No. 13/158,505, filed on Jun. 13, 2011 entitled "CARD CONNECTOR WITH REAR LATCH" and another U.S. patent application Ser. No. 13/174,877 filed on Jul. 1, 2011 titled "CARD CONECTOR ANTI-MISINSERTING A MICRO SD CARD", both of which are assigned to the same assignee as this application.

BACKGROUND OF THE INVENTION

1. Field of the Invention

The present invention relates generally to a card connector, and more particularly to a card connector which has anti-misinsert feature for preventing insertion of a micro SD (Security Digital) card.

2. Description of Related Arts

Micro SD (Security Digital) card standard is published by SD association. A micro SD card usually defines a side notch and a micro SD card connector is used for receiving the micro SD card. The micro SD card connector usually has an ejector comprising a slider, a spring, and a pin member for cooperatively ejecting the micro SD card. The micro SD card connector further comprises a card lock separately or integrally formed with the slider for securing with the side notch of the micro SD card. Presently, JEDEC (Joint Electronic Device Engineering Council) association is establishing a new UFS (Universal Flash Storage) card standard aiming at developing a faster memory card. Therefore, a card connector having a new card lock different from that of micro SD card connector and more particularly, a card connector which has anti-misinsert feature for a micro SD (Security Digital) card is desired.

Hence, a new card connector is desired.

SUMMARY OF THE INVENTION

Accordingly, an object of the present invention is to provide a card connector which has anti-misinsert feature for preventing insertion of a micro SD card.

To achieve the above object, a card connector used for receiving an inserted card, defining a card receiving space and a card insertion/ejection direction, includes an insulative housing having a holding portion, a number of contacts retained in the insulative housing, a slider having a lock retention pocket releasably engaged with the holding portion of the insulative housing, and a spring compressed between the insulative housing and the slider for urging the slider along a card ejection direction. The slider is moveable relative to the insulative housing in response to a separation of the holding portion from the lock retention pocket.

Other objects, advantages and novel features of the invention will become more apparent from the following detailed description when taken in conjunction with the accompanying drawings.

DETAILED DESCRIPTION OF THE PREFERRED EMBODIMENT

Figure 1:
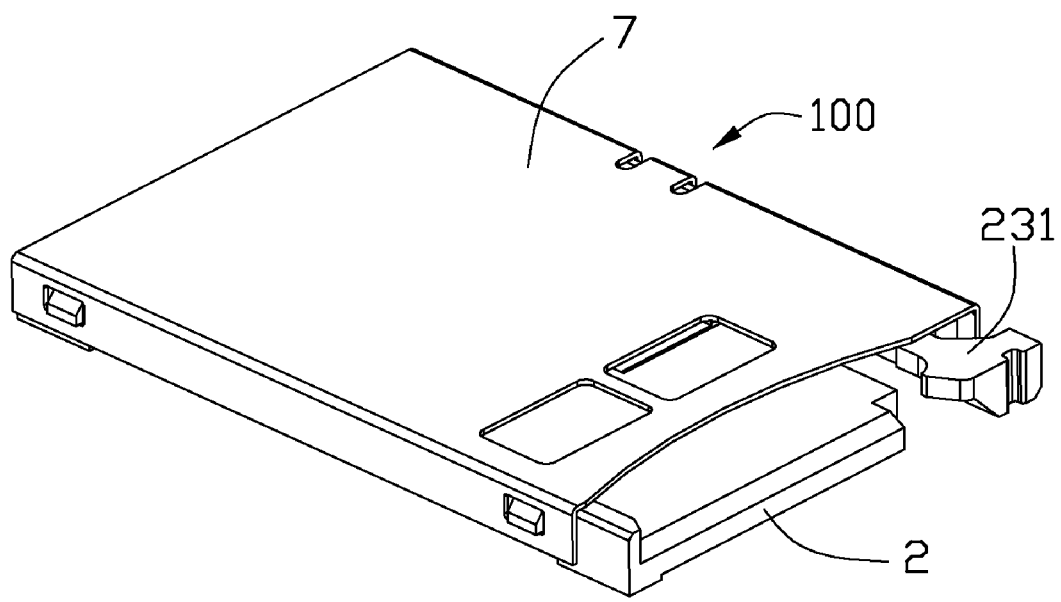
FIG. 1 is a perspective, assembled view of a card connector constructed in accordance with the present invention.
Figure 2:
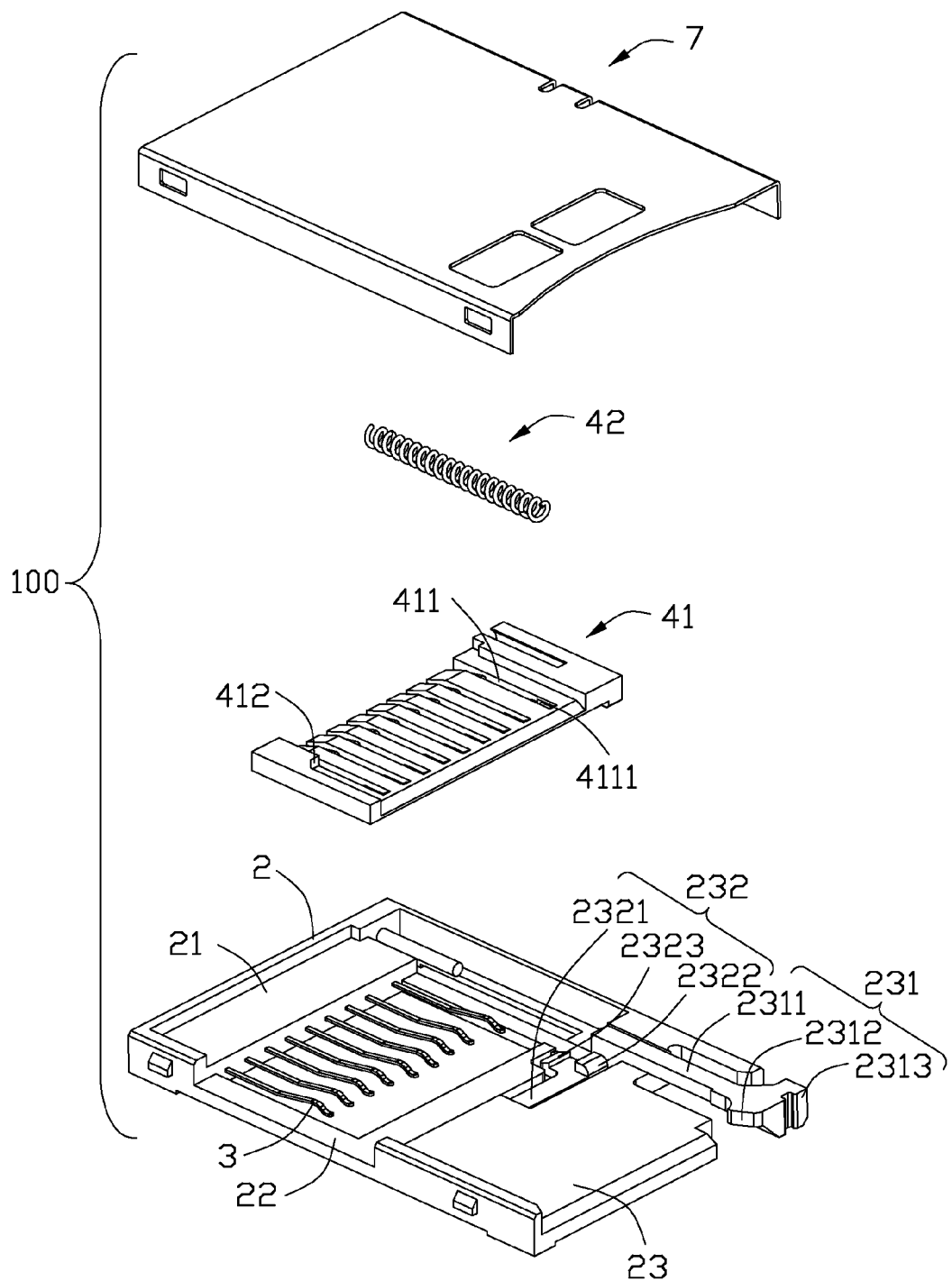
FIG. 2 is a perspective, exploded view of the card connector.
Figure 3:
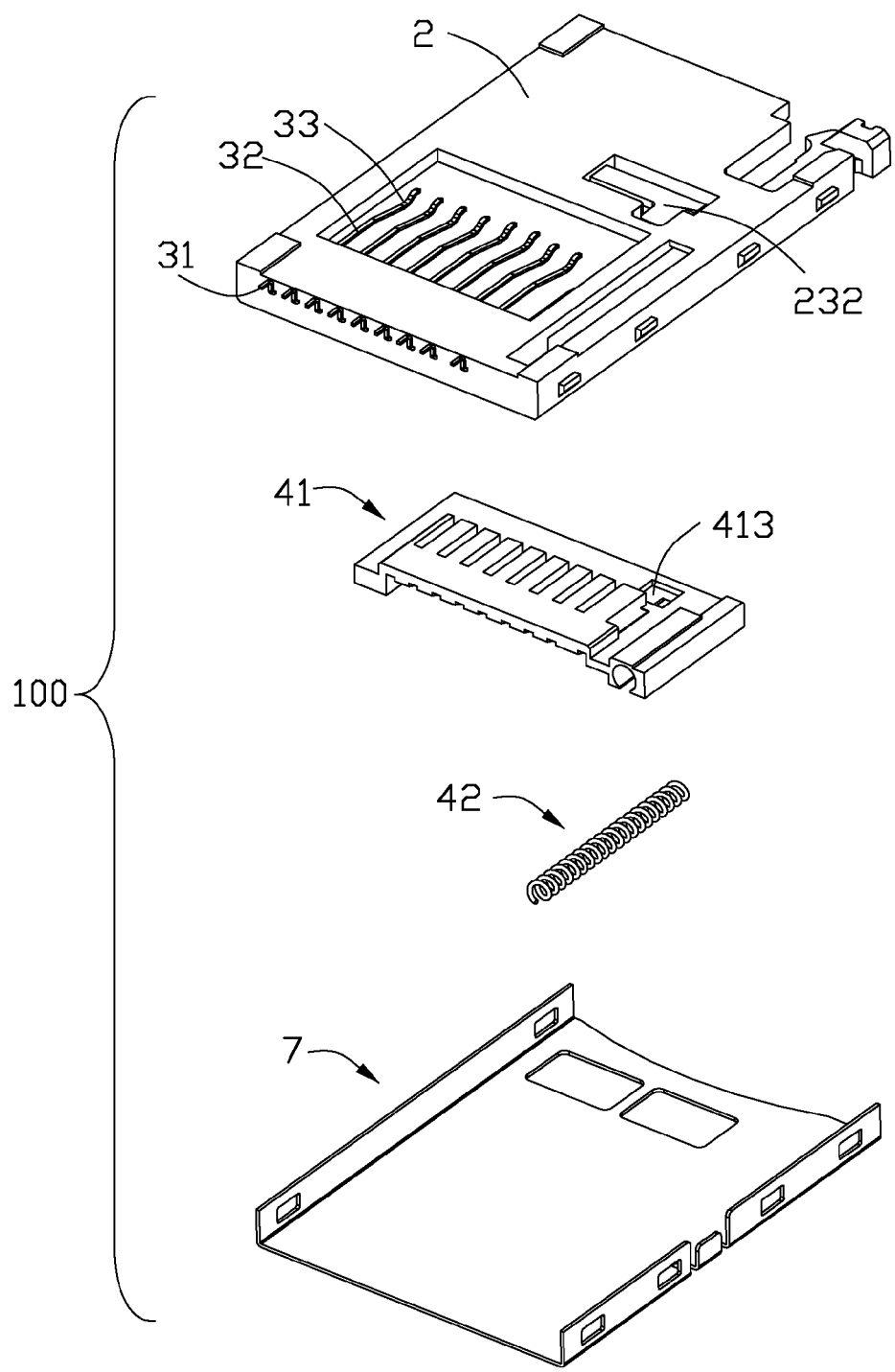
FIG. 3 is another perspective, exploded view of the card connector.
Figure 4:
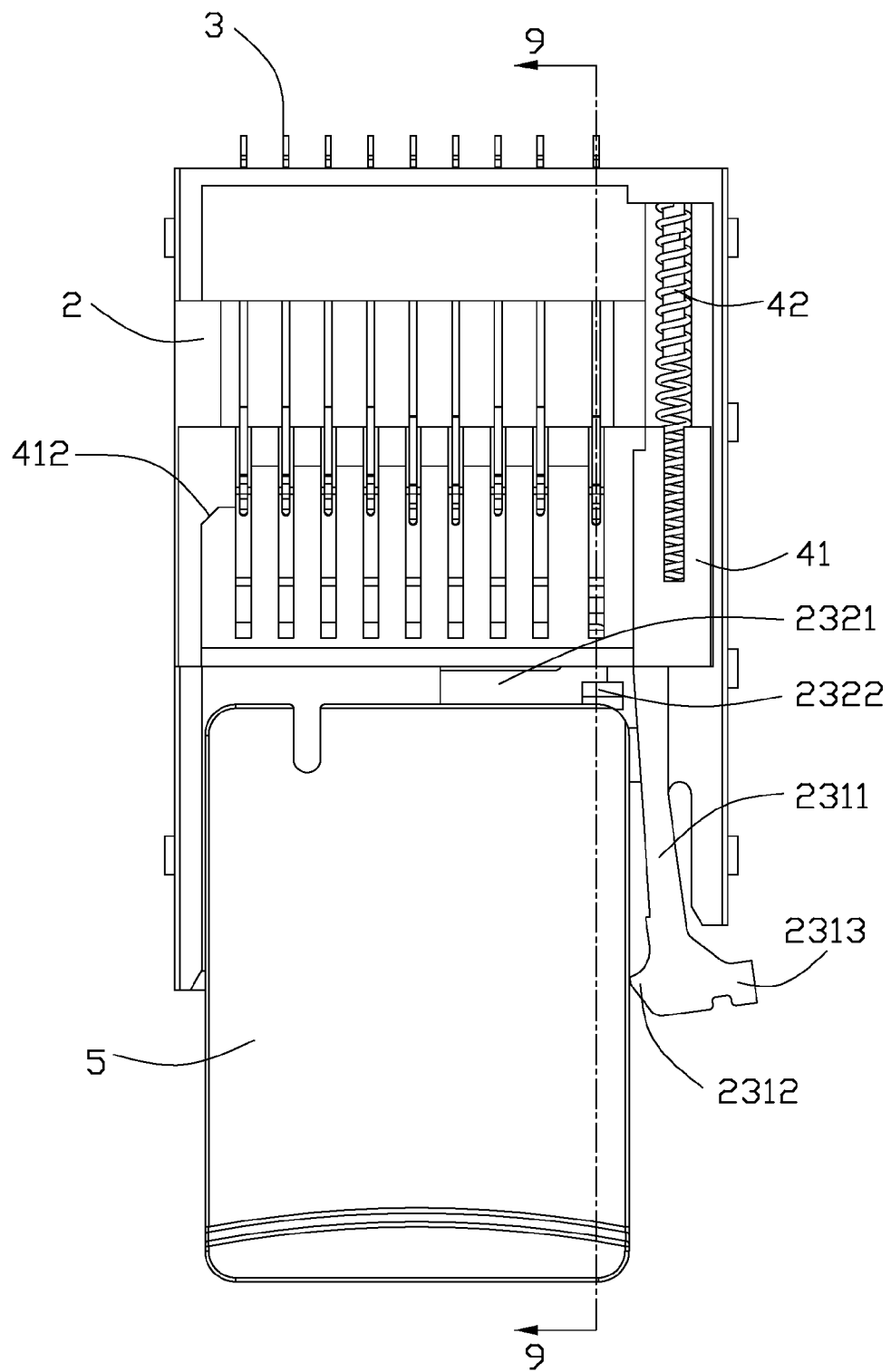
FIG. 4 is a first top plan view of the card connector when a top cover is removed and a UFS card is initially inserted therein.
Figure 5:
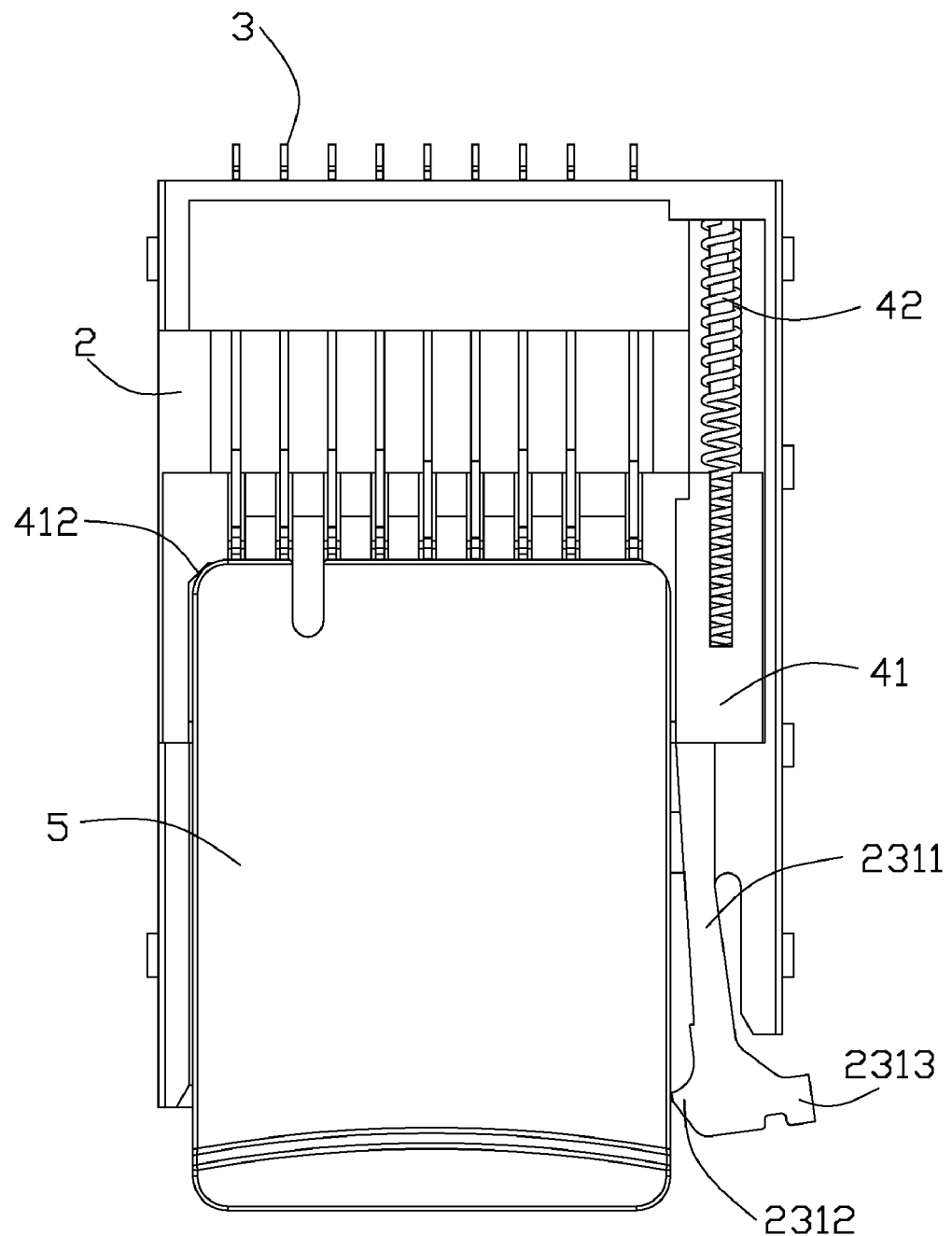
FIG. 5 is a second top plan view of the card connector when the UFS card begins to move the slider along a card insertion direction.
Figure 6:
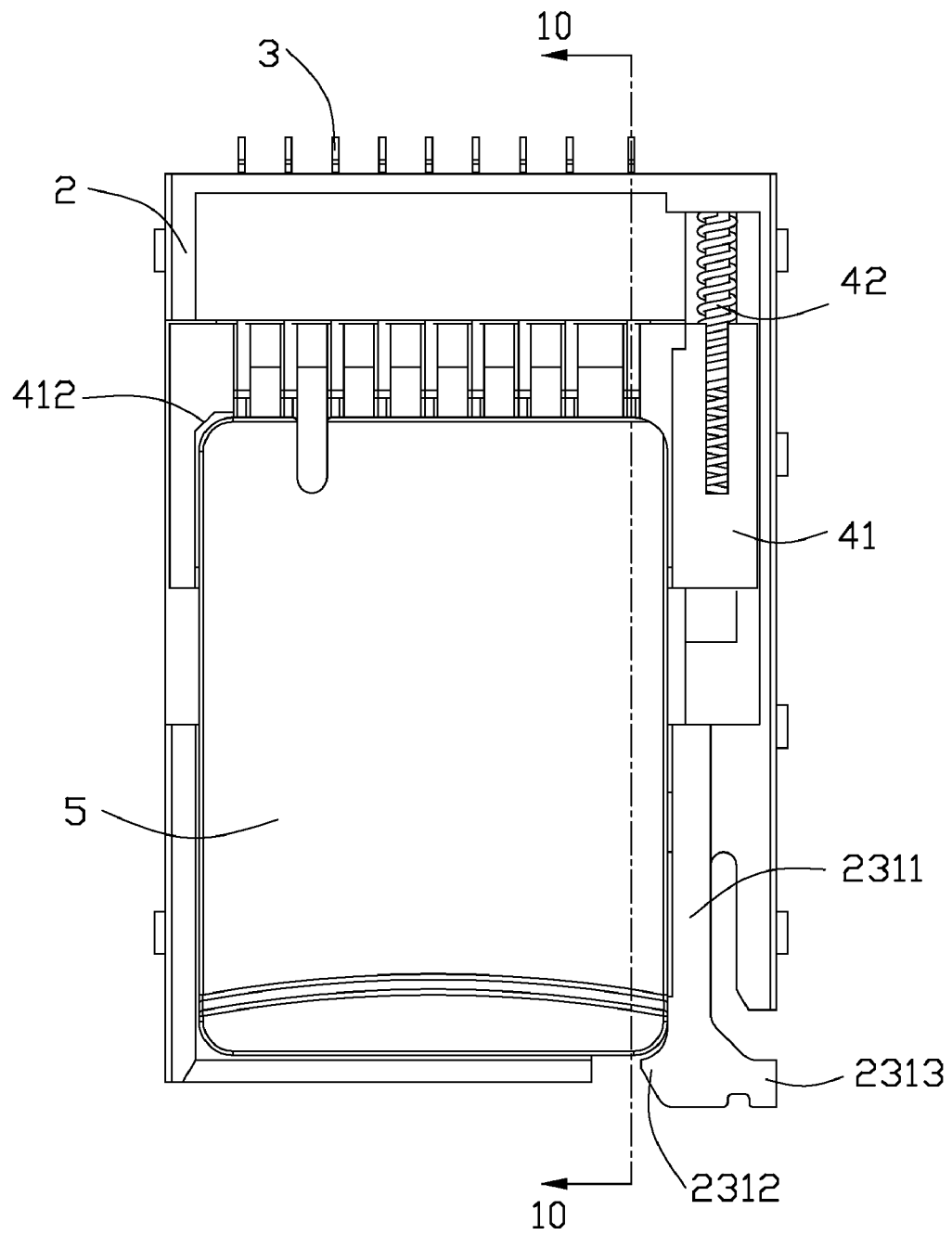
FIG. 6 is a third top plan view of the card connector when the UFS card is fully inserted.

Reference will now be made in detail to the preferred embodiment of the present invention.

Referring to FIGS. 1-10, a card connector 100 in accordance with the present invention used for receiving an inserted card, comprises an insulative housing 2, a plurality of contacts 3 received in the insulative housing 2 along a card insertion direction, a slider 41 assembled on the insulative housing 2, and a spring 42 sandwiched between the insulative housing 2 and the slider 41 for urging the slider 41 along a card ejection direction. The card connector 100 further comprises a metal shell 7 covering the insulative housing 2 for shielding. The inserted card is a UFS (Universal Flash Storage) card 5. A micro SD (Secure Digital) card 6 is prevented from being inserted into the card connector 100.

Referring to FIGS. 2, 3, 9, and 10, the insulative housing 2 comprises a front retaining portion 21, a middle supporting portion 22, and a rear securing portion 23 positioned along the card insertion/ejection direction. The contacts 3 have a plurality of soldering portions 31 extending out of the insulative housing 2, a plurality of connecting portions 32 retained in the retaining portion 21, and a plurality of contacting portions 33 extending rearward upwardly towards the supporting portion 22. The slider 41 is assembled on the supporting portion 22. The slider 41 and the insulative housing 2 together define a card receiving space (not labeled). The insulative housing 2 forms a rear latch 231 at a lateral side of the securing portion 23. The rear latch 231 comprises a flexible arm 2311 integral with the insulative housing 2, a card lock 2312 inwardly formed at the free end of the flexible arm 2311, and an operating portion 2313 formed at the free end of the flexible arm 2311 which is opposite to the card lock 2312. The flexible arm 2311 abuts against the card receiving space and is deflectable away from the card receiving space when the card lock 2312 or the operating portion 2313 is pushed for giving away to the inserted card. The card lock 2312 protrudes towards the card receiving space and is capable of being secured with the inserted card. The insulative housing 2 further comprises an anti-misinsert feature 232 at a frontal, lateral side of the rear latch 231. The anti-misinsert feature 232 comprises a cantilevered beam 2321 integrally connecting to the rear securing portion 23, an activating lug 2322 formed at the distal end of the cantilevered beam 2321, and a holding portion 2323 bending forwardly from the distal end of the cantilevered beam 2321. The flexible arm 2311 extends rearward along the card insertion/ejection direction and is deflectable along a left-and-right direction perpendicular to the card insertion/ejection direction. The cantilevered beam 2321 extends along the left-and-right direction and is deflectable along an up-and-down direction perpendicular to both the left-and-right direction and the card insertion/ejection direction.

Referring to FIGS. 2, 3, 9, and 10, the slider 41 is assembled between the supporting portion 22 and the securing portion 23 of the insulative housing 2. The slider 41 defines a plurality of recesses 411 on an upper surface thereof. The recesses 411 extend along the card insertion/ejection direction for receiving the corresponding contacting portions 33 of the contacts 3. The slider 41 forms a cam 4111 in each recess 411. The contacting portions 33 are raised upwardly into the card receiving space by the cams 4111 for connecting with the inserted card. The slider 41 comprises a confronting portion 412 at a front, left side thereof. The inserted card confronts with the confronting portion 412 for pushing the slider 41 to move along the card insertion direction and the confronting portion 412 reversely pushes the inserted card 5 to move along the card ejection direction. During the movement of the slider 41 along the card insertion direction, the spring 42 is compressed to have elasticity. The elasticity of the spring 42 is released and therefore, the spring 42 urges the slider 41 to move along the card ejection direction. The slider 41 defines a lock retention pocket 413 on a lower surface thereof. The holding portion 2323 of the anti-misinsert feature 232 is engaged with the lock retention pocket 413 of the slider 41 when the card connector 100 is not in use. The activating lug 2322 is located behind the slider 41 to be exposed into the card receiving space. Generally speaking, the slider 41 is engaged with the insulative housing 2 and is movable on the insulative housing 2 between the supporting portion 22 and the securing portion 23 under condition that separating the holding portion 2323 of the anti-misinsert feature 232 from the lock retention pocket 413.

Referring to FIGS. 4-6, 9 and 10, showing a process that the UFS card 5 is inserted into the card receiving space. When the UFS card 5 begins to be inserted into the card receiving space, the front edge of the UFS card 5 pushes the card lock 2312 outwardly and the flexible arm 2311 is deflected away from the card receiving space for giving away for the UFS card 5. Since the UFS card 5 has a larger front width, the UFS card 5 meets with the activating lug 2322 and pushed down the activating lug 2322. The holding portion 2323 is separated from the lock retention pocket 413 during which the cantilevered beam 2321 is deformed and has elasticity. Therefore, the slider 41 is disengages with the insulative housing 2 and is movable forward relative to the insulative housing 2 along the card insertion direction. When the UFS card 5 is inserted as FIG. 5, the UFS card 5 confronts the confronting portion 412 of the slider 41 and begins to drive the slider 41 to move along the card insertion direction. The spring 42 becomes compressed and has elasticity. When the UFS card 5 is fully inserted as FIG. 6, the flexible arm 2311 returns back to its original position and the card lock 2312 is secured with the rear edge of the UFS card 5. The contacting portions 33 of the contacts 3 are raised upwardly for connecting with the UFS card 5. Since the UFS card 5 has a larger front width, the UFS card 5 electrically connects with nine contacting portions 33 of the contacts 3. When the UFS card 5 is ejected, a user pushed the operating portion 2313 outwardly by a finger and the flexible arm 2311 is deflected outwardly. The elasticity of the spring 42 is released for ejecting the UFS card 5. During the ejection of the UFS card 5, the slider 41 moves rearward relative to the insulative housing 2 along the card ejection direction, the elasticity of the cantilevered beam 2321 is released, and the holding portion 2323 returns to be engaged with the lock retention pocket 413 such that the slider 41 engages with the insulative housing 2 again.

Figure 7:
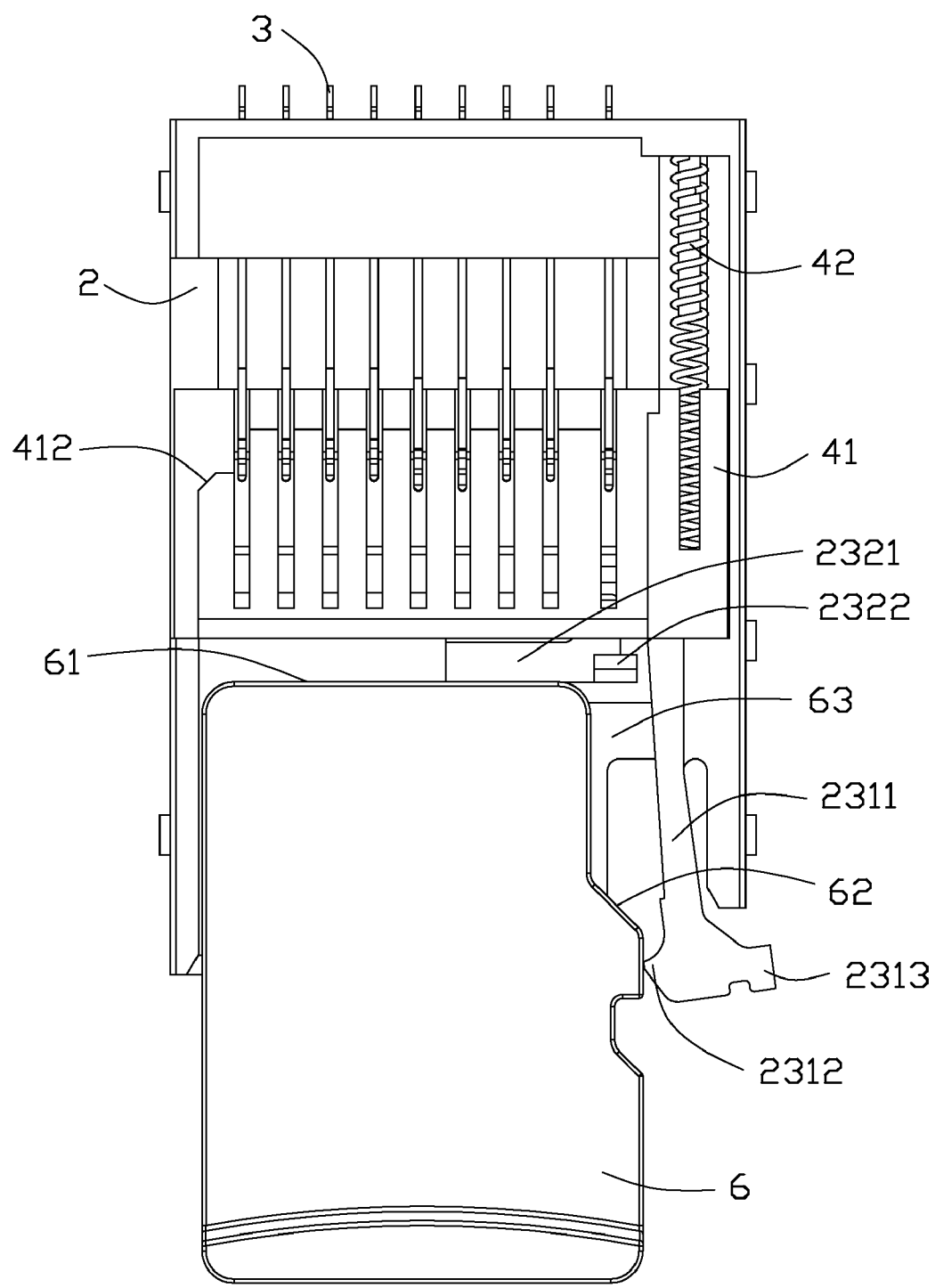
FIG. 7 is a third top plan view of the card connector when the top cover is removed and a micro SD card is initially inserted therein.
Figure 8:
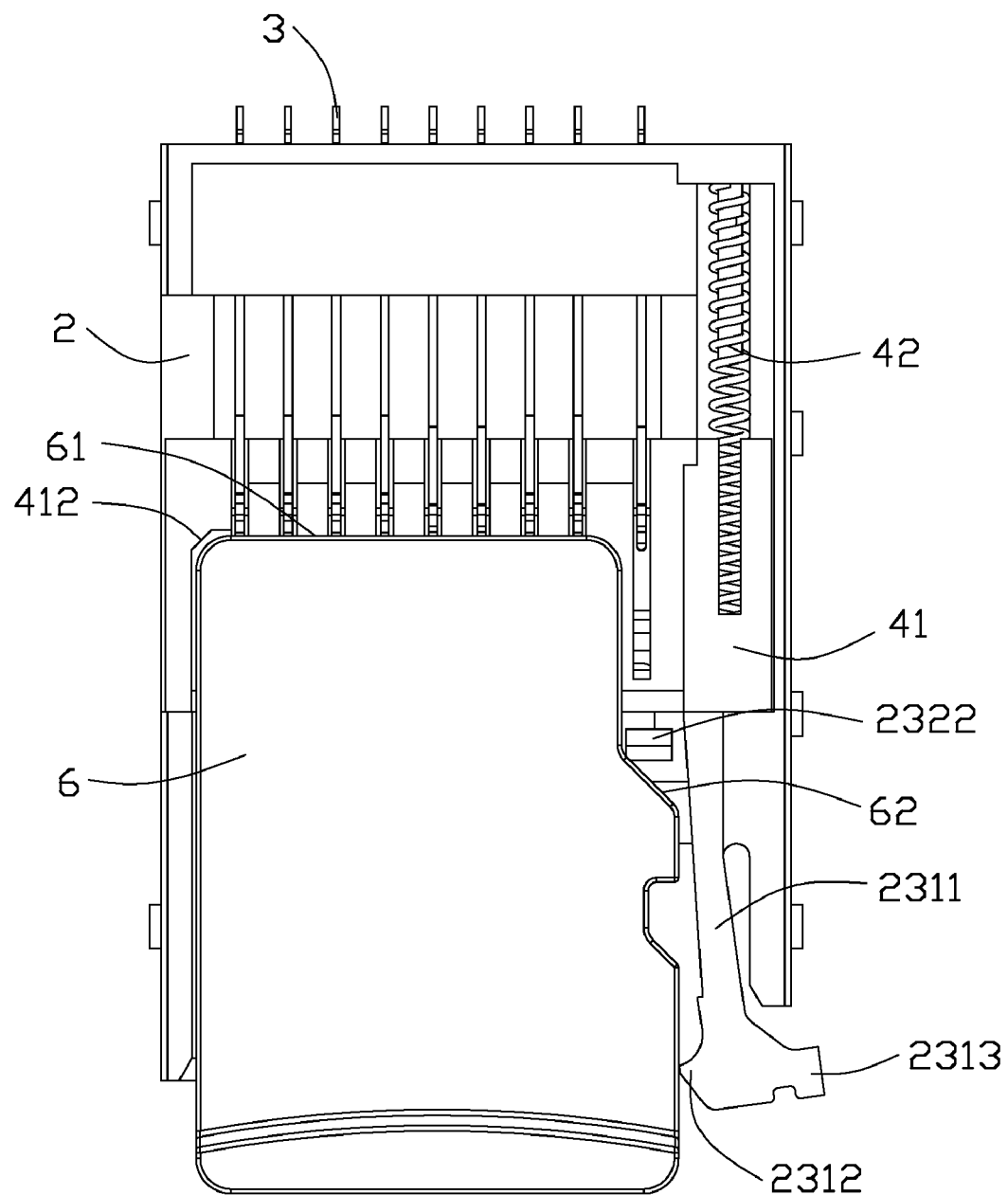
FIG. 8 is a third top plan view of the card connector when the micro SD card begins to confront with the slider but can't move the slider.
Figure 9:
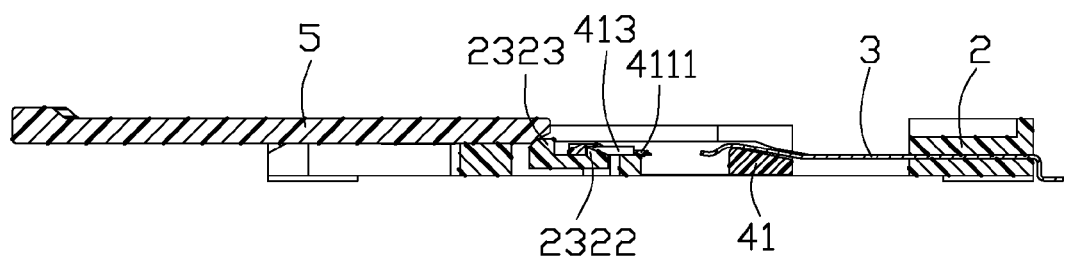
FIG. 9 is a cross-sectional view of the card connector taken along line 9-9 of FIG. 4.
Figure 10:
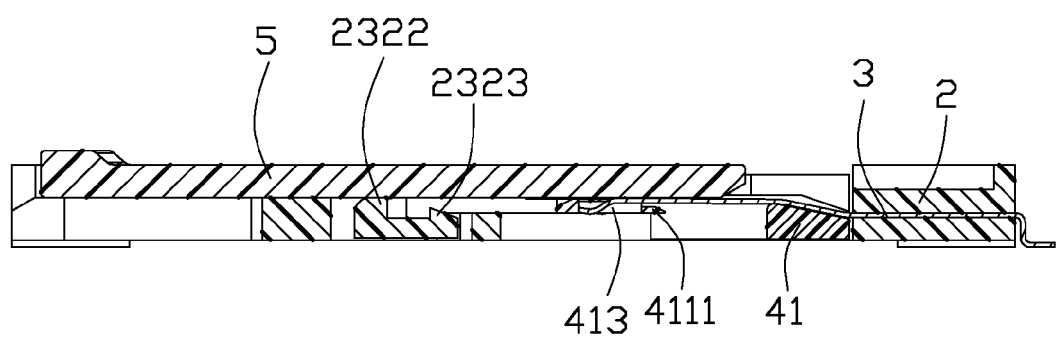
FIG. 10 is another cross-sectional view of the card connector taken along line 10-10 of FIG. 6.

Referring to FIGS. 7 and 8, the micro SD card 6 is partly inserted into the card receiving space. Since the micro SD card 6 has a smaller front edge 61, the front edge 61 of the micro SD card 6 does not push the card lock 2312 but the middle part of the micro SD card 6 having a slant edge 62 with a largest width larger than that of the front edge 61, pushes the card lock 2312 outwardly for instead. Therefore, the flexible arm 2311 is deflected by the micro SD card 6 away from the card receiving space for giving away for the micro SD card 6. However, the front part of the micro SD card 6 defines a cutout 63 between the front edge 61 and the slant edge 62. In the present invention, the cutout 63 has a length along the card insertion/ejection direction at least equal to a smallest distance between the activating lug 2322 and the confronting portion 412. When the micro SD card 6 is initially inserted into the card connector 100 as showing in FIG. 7, the micro SD card 6 can not push down the activating lug 2322. Therefore, the slider 41 keeps engagement with the insulative housing 2. Even though the micro SD card 6 confronts the confronting portion 412 of the slider 41 as FIG. 8, the slider 41 is not driven by the micro SD card 6 to move along the card insertion direction.

In the card connector 100 of the present invention, the slider 41 is engaged with the insulative housing 2. The slider 41 moves along the insulative housing 2 only under condition that the holding portion 2323 of the anti-misinsert feature 232 is separated from the lock retention pocket 413. The slider 41 is immovable relative to the insulative housing 2 if the holding portion 2323 of the anti-misinsert feature 232 is not separated from the lock retention pocket 413. Since the UFS card 5 has a larger front width while the micro SD card 6 defines a cutout 63 at a front part thereof, the UFS card 5 could disengage the slider 41 from the insulative housing 2, but the micro SD card 6 could not disengage the slider 41 from the insulative housing 2. Thus, the card connector 100 is used for receiving the UFS card 5. The micro SD card 6 is prevented from being inserted into the card connector 100.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector used for receiving an inserted card, defining a card receiving space and a card insertion/ejection direction, comprising:

an insulative housing having a holding portion;
a plurality of contacts retained in the insulative housing;
a slider having a lock retention pocket releasably engaged with the holding portion of the insulative housing; and
a spring compressed between the insulative housing and the slider for urging the slider along the card ejection direction; wherein
the slider is moveable relative to the insulative housing in response to a separation of the holding portion from the lock retention pocket, wherein the insulative housing comprises an activating lug located behind the slider and the activating lug is exposed into the card receiving space, wherein the insulative housing comprises a cantilevered beam connected to the activating lug and the holding portion bends forwardly from a distal end of the cantilevered beam, wherein the cantilevered beam extends along a left-and-right direction and is deflectable along an up-and-down direction perpendicular to both the left-and-right direction and the card insertion/ejection direction.

2. The card connector as claimed in claim 1, wherein the insulative housing comprises a rear latch having a card lock extending to a rear edge of the inserted card for securing with the rear edge of the inserted card.

3. The card connector as claimed in claim 2, wherein the rear latch comprises a flexible arm integral with the insulative housing and the card lock is formed at the free end of the flexible arm.

4. The card connector as claimed in claim 3, wherein the flexible arm extends rearward along the card insertion/ejection direction and is deflectable along the left-and-right direction.

5. The card connector as claimed in claim 4, wherein the card lock protrudes towards the card receiving space and the rear latch comprises an operating portion formed at the free end of the flexible arm opposite to the card lock.

6. The card connector as claimed in claim 1, wherein the contacts are raised up into the card receiving space during a movement of the slider along the card insertion direction.

7. The card connector as claimed in claim 1, wherein the slider comprises a confronting portion which the inserted card confronts with for pushing the slider along the card insertion direction and for the slider to push the inserted card out of the card receiving space along the card ejection direction.

8. The card connector as claimed in claim 7, wherein the inserted card is a UFS card having a larger front edge and a micro SD card having a smaller front edge is prevented from being inserted into the card receiving space.

9. The card connector as claimed in claim 8, wherein the micro SD card has a slant edge at a middle part thereof and the micro SD card defines a cutout between the front edge and the slant edge, and wherein the cutout has a length at least equal to a smallest distance between the activating lug and the confronting portion.

10. A card connector comprising:
a case defining a card receiving cavity;
a plurality of contacts disposed around the case with contacting sections extending into the card receiving cavity;
a slider back and forth moveable along a front-to-back direction in the case via a spring;
a locking device formed between the case and the slider to prevent relative movement between the slider and the case; and
a releasing device located around the locking device and adapted to unlock the locking device; wherein
said releasing device is configured to be adapted to be actuated by a first type card while not to be actuated by a second type card even though both said first and second type cards can be initially inserted into the card receiving cavity, wherein said releasing device is moveable in a vertical direction perpendicular to both the front-to-back direction and a transverse direction, wherein said locking device is moveable in the vertical direction in response to movement of the releasing device, wherein the releasing device is positioned at a position where the first type card having a larger transverse dimension can reach.

11. The card connector as claimed in claim 10, wherein said case is essentially an insulative housing in which the contacts are disposed.

12. The card connector as claimed in claim 10, wherein the releasing device is formed on the case.

13. The card connector as claimed in claim 10, wherein said slider can actuate the contact to move into the card receiving cavity.

* * * * *